United States Patent [19]

Ross et al.

[11] Patent Number: 4,719,703

[45] Date of Patent: Jan. 19, 1988

[54] MULTICOORDINATE MEASURING MACHINE

[75] Inventors: Günther Ross, Oberndorf; Volker Schwarz, Zimmern, both of Fed. Rep. of Germany

[73] Assignee: Mauser-Werke Oberndorf GmbH, Fed. Rep. of Germany

[21] Appl. No.: 849,881

[22] Filed: Apr. 9, 1986

[30] Foreign Application Priority Data

Apr. 11, 1985 [DE] Fed. Rep. of Germany ....... 3512935

[51] Int. Cl.⁴ ................................................ G01B 7/03
[52] U.S. Cl. ........................................ 33/1 M; 33/503
[58] Field of Search ................ 33/1 M, 125 C, 503, 33/504, 505, 572; 356/375

[56] References Cited

U.S. PATENT DOCUMENTS

| | | | |
|---|---|---|---|
| 3,386,174 | 6/1968 | Leach et al. | 33/572 |
| 3,434,218 | 3/1969 | Potter | 33/125 C |
| 3,749,501 | 7/1973 | Wieg | 33/1 M |
| 4,597,182 | 7/1986 | Rinn | 33/503 |

FOREIGN PATENT DOCUMENTS

| | | | |
|---|---|---|---|
| 2248194 | 12/1977 | Fed. Rep. of Germany . | |
| 0000302 | 1/1985 | Japan | 33/1 M |

*Primary Examiner*—Charles Frankfort
*Assistant Examiner*—Patrick R. Scanlon
*Attorney, Agent, or Firm*—McGlew and Tuttle

[57] ABSTRACT

For accurately determining the position of a measuring head 14, a multicoordinate measuring machine has an additional measuring device, which essentially is formed by a scanning head 19 having a measuring probe 20, and inserted in a beam 16. The position of a cross arm 6 in a distance A is determined by means of the measuring probe 20 and is passed on over an amplifier 22 to a computer 25 for control and display purposes. The coordinate measuring machine operates with only one length scale 5. The cross arm 6 is supported at its ends and without play on carriages 11 and 12, which can be moved in the X direction in guiding systems 3 and 4, which are arranged parallel to each other.

6 Claims, 1 Drawing Figure

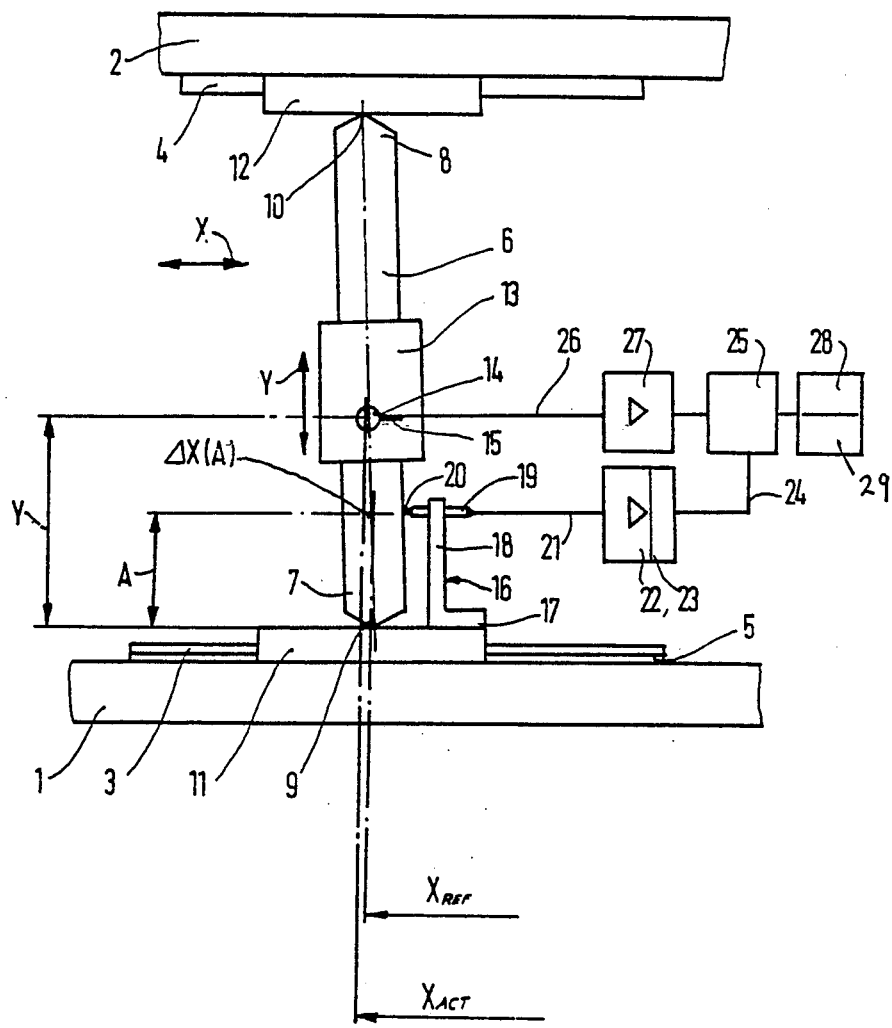

MULTICOORDINATE MEASURING MACHINE

FIELD AND BACKGROUND OF THE INVENTION

The invention relates to a multicoordinate measuring machine with two guiding devices, which are arranged parallel to each other and at a distance from each other, between which a cross arm, inserted at right angles, is movable on carriages at either end. The cross arm, in turn has a further carriage, which is movable along its longitudinal axis and carries a measuring head with at least one measuring probe, the actual position of which is detected by an electrical system and indicated by means of an electric output signal.

German Auslegeschrift Pat. No. 2,248,194 discloses a multicoordinate measuring machine, especially for length measurements, and for determining the position and magnitude of openings, contours, projections, etc. This known measuring machine is constructed in the style of a measuring bridge machine and moves with the two parallel columns in appropriate guiding systems. The measuring head itself is mounted on a beam, which is movable on the bridge. The problem with such multicoordinate measuring machines is that the two columns, even if precision is very high, assume different positions during their movement in the allocated guiding systems.

This problem cannot be eliminated completely, even if expensive and technically costly precision elements are used. In order, nevertheless, to determine the exact position of the measuring head in the direction of motion X of the columns, this known multicoordinate measuring machine has two measuring devices, which are installed in each case along the guiding systems of the columns. A third measuring device determines the position of the measuring head along its guiding system on the bridge. These three measuring heads are connected to an electrical system for determining the actual position of the measuring head.

Even though the actual position of the measuring head on the X axis can be determined by this multicoordinate measuring machine with the help of the measuring devices and the allocated electrical system, the technical effort involved, with a total of three measuring devices, does however represent a considerable disadvantage. The fact that more parts are required in order to measure the respective reference position and that several measuring devices are used to determine an actual position of the measuring head, represents a new and additional source of error.

SUMMARY OF THE INVENTION

It is therefore an objective of the invention to provide a multicoordinate measuring machine of the type mentioned at the beginning, for which the exact position of the measuring head can be determined with few and technically simple means, when this measuring head is moved along a second axis.

The inventive objective is accomplished by using a cross arm which is hinged without play with its two front ends on its allocated carriages, one of which accomodates a beam, which is oriented at right angles to its guiding system and which, at a freely controllable distance from the hinge point, has on the cross arm a scanning head. The measuring probe of the scanning head touches on the cross arm and transmits the measured value corresponding to the position of the cross arm relative to the guidance system over installed wiring to an electrical system for evaluation, display and control.

Moreover, in developing the invention, a length scale in the X direction of motion of the machine can be provided on only one of the guiding systems and the deviation of the cross arm from the position at right angles to the guiding systems can be measured at a freely controllable distance from the allocated guiding system and used to determine the actual coordinate value $X_{ACT}$ according to the formula:

$$X_{ACT} = X_{REF} + Y/A(\Delta X_{(A)})$$

in which $X_{REF}$ is the position of the pivotal or hinge point of the cross arm at the appropriate guiding system, Y is the distance of the measuring head on the cross arm from the pivotal point of the cross arm, A is the distance of the measuring probe from the pivotal point and $\Delta X_{(A)}$ is the difference between the position of the cross arm at the point of the measuring probe and $X_{ref}$, from which the accepted value is passed over wiring to an amplifier and an analog/digital converter, where the value can be displayed or alternatively supplied over a computer to a control system with the measurement of the measuring machine.

The above equation is derived from the fact that $X_{A}CT = X_{REF} + \Delta X$ where $\Delta X$ is the difference between $X_{REF}$ and $X_{ACT}$. In a situation where $\Delta X$ is unknown, such value may be determined from the fact that $Y/A = \Delta X/\Delta X (A)$. This is true because when parallel lines are intersected by a line, sections on one side of the intersecting line are proportional to another and corresponding section on the other intersecting line, and the parallel lengths cut out are to one another as the distance of the corresponding points from the point of intersection. This geometrical relationship can be seen from FIG. 1.

Substituting the value of $\Delta X$ with the known values Y, A, $\Delta X$ (A) the value of $X_{ACT}$ may be determined.

Moreover, the beam itself may be a body of rectangular shape having a lower web of which is arranged on the carriage parallel to the guiding system and another web which is aligned perpendicularly to the guiding system and carries the measuring probe.

In a further development of the invention, the parallel guiding systems may be arranged on a lower and an upper foundation, between which the cross arm, standing vertically on carriages, is pivoted without play, while the measurement head leads away vertically from the cross arm and is connected over electric wiring with the computer, which receives the correcting measurement from the measurement probe. The driving units of the carriage may be connected on the guiding systems by a double driving system.

The inventive coordinate measuring machine requires only a single length scale for determining the position of the measuring head exactly.

The front ends of the cross arm, which are pivoted without play on the carriages, enable this cross arm to be shifted from its position perpendicular to the guiding systems to an inclined position, without there being any cant. The deviation of the measurement head from its theoretical position is determined by way of a simple measuring system, which is integrated in a beam that is rigidly arranged on one of the carriages. By means of this measuring system, the inclination of the cross arm, as well as its exact rectangular arrangement, is determined satisfactorily and processed with the help of the stationary position of the measuring head into a control signal or a display signal of the coordinate measuring machine.

Accordingly an object of the present invention is to provide a multicoordinate measuring machine comprising a pair of spaced apart parallel guiding systems each extending in a first coordinate direction, a carriage for each guiding system mounted on its guiding system for movement in the first coordinate direction, a cross arm extending substantially perpendicularly to the first coordinate direction, the cross beam having opposite ends, each end being pivotally connected at a pivot point to one of the carriages, a beam extending from one of the carriages at right angles to the first coordinate direction, a scanning head connected to the beam and having a measuring probe contacting the beam at a selected distance from the pivot connection of the carriage carrying the beam, and an electrical evaluation mechanism connected to the probe for determining the actual position of a measuring head on the beam at a location intermediate its opposite ends.

A further object of the invention is to provide a coordinate measuring machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only drawing in the application is a schematic representation of one embodiment of the invention.

DESCRIPTION OF THE PREFERRED EMBODIMENT

In the schematic representation of the inventive coordinate machine, a lower foundation 1 and an upper foundation 2, which may also be a bridge, are provided parallel to and at a distance from one another. Guiding systems 3 and 4 are mounted on the foundations 1 and 2. Systems 3 and 4, in turn, also run exactly parallel to one another. Moreover, a length scale 5 is mounted at the lower guiding rail 3. A rectangular cross arm 6 is pivoted at its two ends 7 and 8, without play and at the points 9 and 10, on carriages 11 and 12, respectively. The arm 6 is inserted between the two guiding systems 3 and 4. They are driven by means of a central drive motor, which is not shown here and from which appropriate gearing elements are drive-connected with the carriages 11 and 12. On the cross arm 6, there is a further carriage 13, which is movable in the longitudinal direction of the cross arm 6. This carriage 13 carries a measuring head 14 with at least one measuring probe 15.

A beam 16 is constructed on the lower carriage 11, which is aligned exactly at right angles to the lower guiding system 3. For this purpose, a lower leg 17 of the angular beam 16 is set up on the lower carriage 11, while a vertically upright leg 18 accomodates a scanning head 19 with a measuring probe 20. The measuring probe 20 is at a fixed distance A from the pivotal point 9 of the cross arm 6 on the lower carriage 11, it being possible to fix this distance A at any convenient value.

From the scanning head 19, wiring 21 leads to an amplifier 22 with analog-to-digital converter 23, from where the value, measured by the measuring probe 20, is displayed. Instead of this direct display, or also in addition to it, wiring 24 runs from the amplifier 22 with the converter 23 to a computer 25, in which the deviation measurement from the measuring probe 20 is processed together with the measurement of the position of the measuring head 14 in the Y direction. For this purpose, the computer is furthermore connected over wiring 26 and an interposed amplifier 27, with a measuring head 14. The computer, in turn, may be connected to a control system 28 or the display 29 of the coordinate measuring machine.

When the cross arm 16 is moved on carriages 11 and 12 in the coordinate direction X for the purpose of conducting a measurement, the danger exists, especially because of the large distance between the guiding systems 3 and 4, that the pivotal point 9 will find itself in a position displaced from the perpendicular line relative to the upper pivotal point 10. This would mean that the measuring head 14, on its displacement path on the cross arm 6, also takes up a position, which deviates from the theoretical position.

A measurement error would be unavoidable in this case. In order to determine the actual value of the measuring head 14 in the X direction of movement, a correction measurement, which is independent of its distance A from the pivotal point of the cross arm 6 on the carriage 11, is now determined with the measuring probe 20. From the given geometric relationships, the actual position of the measuring head 14 in the X direction can now be determined from the formula:

$$X_{ACT} = X_{REF} + Y/A(\Delta X_{(A)})$$

where the variables are defined above.

Distance A is a known value. The parameters $X_{ref}$, $Y$ and $\Delta X_{(A)}$ are measured by length scale 5, measuring head 14 and measuring probe 20, respectively.

With the help of the aforementioned measuring devices, the exact position of the measuring probe 15 can be determined by supplying the signals, coming from these measuring devices 5, 20 and 14, to an electrical system such as computer 25, over wiring 21 and 26.

As shown in the drawing, the difference in position between $X_{REF}$ and the position of the cross arm at the point A is measured by a signal from the measuring probe 20. The signal thus corresponds to the value $\Delta X_{(A)}$.

While a specific embodiment of the invention has been shown and described in detail to illustrate the application of the principles of the invention, it will be understood that the invention may be embodied otherwise without departing from such principles.

What is claimed is:

1. A multicoordinate measuring machine comprising two guiding systems each extending in a first coordinate direction and being spaced from each other in a second coordinate direction, a first carriage movably mounted on one of said guiding systems for movement in the first coordinate direction, a second carriage movably mounted to the other of said guiding systems for movement in said first coordinate direction, a cross arm having opposite ends extending between said guiding systems, one end being connected at a first pivot point to said first carriage and the other end being connected at a second pivot point to said second carriage, said cross arm extending at least approximately in said second coordinate direction, a measuring head having at least one measuring probe mounted on said cross arm at a location intermediate said ends of said cross arm, electrical means electrically connected to said measuring head for generating a signal corresponding to an actual position of said measuring probe in said first coordinate direction, a beam, connected to said first carriage and extending in said second coordinate direction at right angles to said first coordinate direction, a scanning head having a further measuring probe engaged with said cross arm at a contact point separated from said first pivot point by a selected distance, said scanning head being mounted on said beam, said further measuring probe being connected to said electrical means for generating a signal corresponding to a position of said cross arm at said selected distance from said first pivot point and in said first coordinate direction.

2. A multicoordinate measuring machine according to claim 1 including a length scale provided only on said guiding system carrying said first carriage for indicating a reference position $X_{REF}$ of said first carriage and said first pivot point in said first coordinate direction, said electrical means calculating the actual position of said first-mentioned measuring probe of said measuring head in said first coordinate direction $X_{ACT}$, using the formula:

$$X_{ACT} = X_{REF} + Y/A(\Delta X_{(A)})$$

wherein Y is a distance of the first-mentioned measuring probe of the measuring head in the second coordinate direction from the first pivot point, A is the distance of the further measuring probe from the first pivot point, and $\Delta X_{(A)}$ is a difference between $X_{ACT}$ and $X_{REF}$ corresponding to an output of said further measuring probe.

3. A machine according to claim 2 wherein said electrical means comprise wiring connected to said further measuring probe, an amplifier connected to said wiring for amplifying a signal from the first-mentioned measuring probe, an analog-to-digital converter connected to said amplifier, a computer connected to said analog-to-digital converter and measurement evaluating means connected to said computer for evaluating and displaying the actual position $X_{ACT}$ of the first-mentioned measuring probe of the measuring head.

4. A machine according to claim 1 wherein said beam is L-shaped with a lower leg connected to said first carriage and extending in said first coordinate direction and a second leg extending from said first leg in said second coordinate direction which is perpendicular to said first coordinate direction, said second leg carrying said scanning head and the further measuring probe.

5. A machine according to claim 3 including spaced apart foundations extending in said first coordinate direction, each of said guiding systems being connected to one of said foundations, said measuring head being mounted for movement on said cross arm in said second coordinate direction, and electrical wiring connected between said measuring head and said computer for applying signals from said first-mentioned measuring probe of said measuring head to said computer.

6. A machine according to claim 5 including an amplifier connected between said measuring head and said computer.

* * * * *